Oct. 3, 1961 S. F. MICHELETTI 3,002,387
SEALED SAMPLE INJECTOR FOR GAS CHROMATOGRAPHY
Filed Nov. 26, 1957 3 Sheets-Sheet 1

Inventor
Steno F. Micheletti
By Everett A. Johnson
Attorney

Oct. 3, 1961 S. F. MICHELETTI 3,002,387
SEALED SAMPLE INJECTOR FOR GAS CHROMATOGRAPHY
Filed Nov. 26, 1957 3 Sheets-Sheet 2
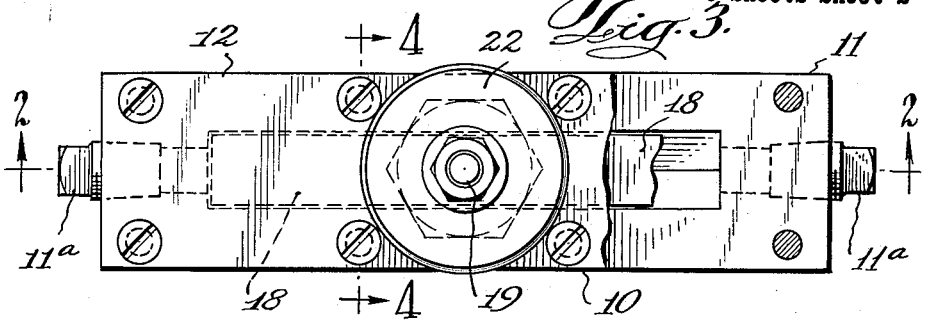
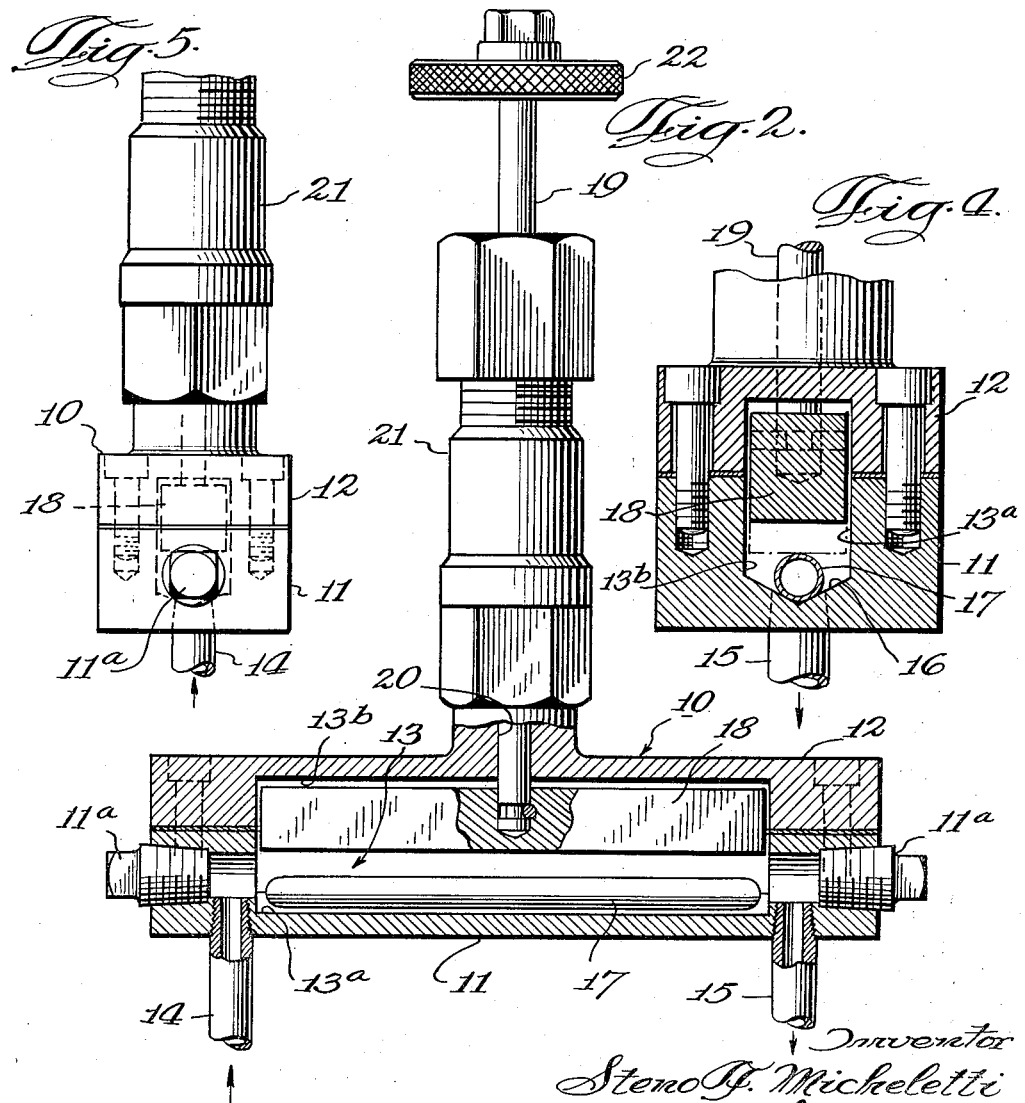
Inventor
Steno F. Micheletti
By Everett A. Johnson
Attorney

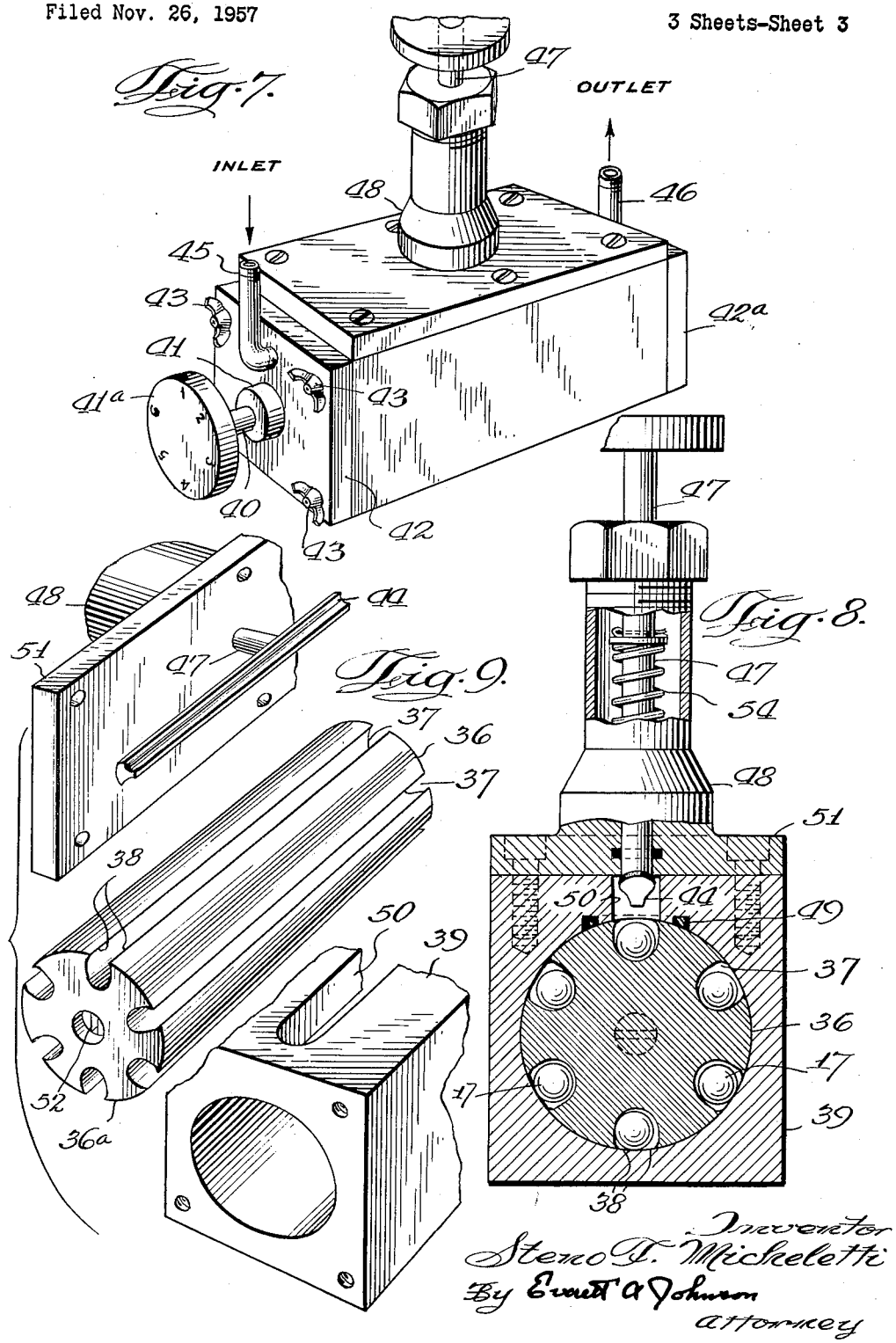

3,002,387
SEALED SAMPLE INJECTOR FOR GAS
CHROMATOGRAPHY
Steno F. Micheletti, Galveston, Tex., assignor, by mesne assignments, to Standard Oil Company, Chicago, Ill., a corporation of Indiana
Filed Nov. 26, 1957, Ser. No. 699,049
2 Claims. (Cl. 73—422)

This invention relates to the introduction of precise samples of fluids into a closed system without contamination of either the sample or the system. More particularly, the invention pertains to a device for introducing sealed fluid samples into gas chromatographic analyzer apparatus.

Work in connection with gas chromatography requires the injection of fluid samples into a system including a packed column supporting a stationary liquid phase. Samples of the order of 1–40 mgm. are charged to small columns, but samples as large as 400 mgm. or more may be charged to larger columns. An eluting gas flows through the column and components of the introduced sample are swept from the column in identifiable sequence.

Frequently, it is desired to introduce repeatedly micro samples of uniform volume. Further, it is desired to introduce such samples without disturbing the balance of the gas chromatographic analyzer installation. Another difficulty with prior systems is that they inherently introduce air with the sample which hinders elution of non-condensibles from the column.

Heretofore, injector systems have been proposed, but such systems usually require lubricants which are detrimental to the analysis. The lubricants tend to dissolve or extract material from the sample and interfere with quantitative aspects of the analysis. Further, the lubricants may become contaminants in the system and this is particularly undesirable in systems such as these since the sample under analysis is quite small with components present in only trace amounts.

It is, therefore, a primary object of this invention to provide a system for injecting a wide range of sample volumes into a chromatographic column or system wherein the difficulties heretofore encountered are avoided. It is a further object of the invention to provide a system for introducing micro quantities of a sample without contamination of the analysis system or loss of sample components. An additional object of the invention is to provide an apparatus which is rugged in construction, foolproof in operation, and is well adapted for introducing predetermined volumes of samples into gas chromatographic apparatus. A further object is to provide a system which is essentially leakproof, has small holdup, and wherein all lubricants are eliminated.

It is also an object of the invention to provide a system adapted for introducing samples in the liquid, solid, or vapor phases. A further object of the invention is to provide a system adapted to handle samples of wide boiling range. It is a further object of the invention to provide a sample introduction system and apparatus wherein the temperature of the sample may be adjusted before it is introduced into the gas stream. Another object of the invention is to provide a system whereby a plurality of individually segregated samples may be successively and selectively introduced into the analysis system. These and other objects of the invention will become apparent as the description thereof proceeds.

Briefly, I attain the objects of the invention by providing a sample dispensing device which comprises a chamber adapted to receive a frangible ampule of the sample. The device includes a sealed chamber into which the ampule is insertable, and a bar controllable from outside the chamber. The bar is arranged to be moved against the ampule so as to rupture it and release the sample. The chamber is provided with an inlet and an outlet to provide for the flow of the gasiform eluting medium through the sample chamber whereby the released sample is exposed to the eluting medium and transported to the analysis column.

Inasmuch as the quantity of the sample or reagent can be determined beforehand with great precision, the exact quantity of the material to be dispensed can be very accurately controlled by selecting an ampule of the desired volume. When this ampule is broken within my device in the flow path of the gasiform eluting medium, the entire sample, and only the sample, is introduced into the analyzer.

Further details and advantages of the invention will be described in connection with the accompanying drawings illustrating preferred embodiments of the invention and wherein:

FIGURE 1 schematically illustrates a typical installation embodying the apparatus according to my invention;

FIGURE 2 is a side elevation partly in section of one embodiment;

FIGURE 3 is a plan view of the apparatus in FIGURE 2;

FIGURE 4 is a section taken along the line 4—4 in FIGURE 3;

FIGURE 5 is a fragmentary end view of FIGURE 3;

FIGURE 7 is a perspective of another embodiment of a multiple sample injector;

FIGURE 8 is a section taken along the line 8—8 in FIGURE 7; and

FIGURE 9 is an exploded view of components of the device shown in FIGURES 7 and 8.

Figure 1:
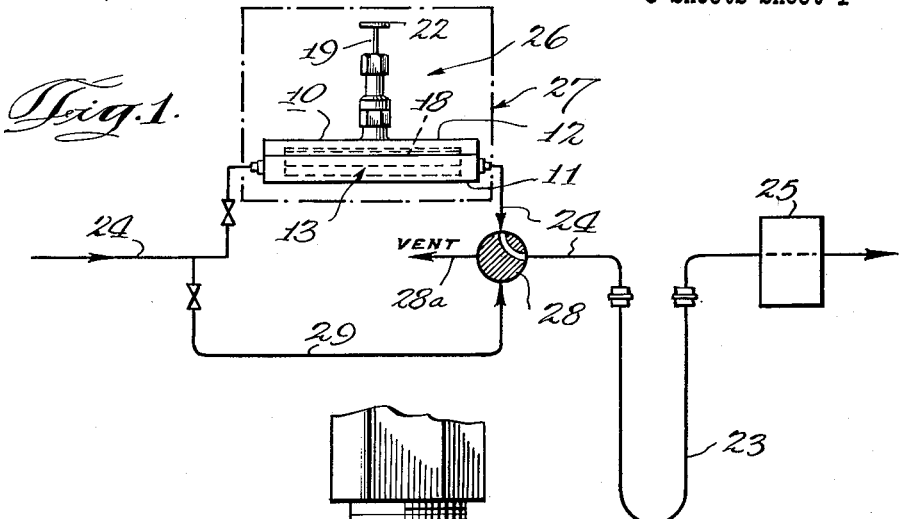

Referring to FIGURES 1–5 in the drawings, the apparatus comprises a body 10 including a lower block 11 and an upper block 12, each having cavities 13a and 13b which together form the chamber 13. Opposite ends of the chamber 13 are provided with fluid inlet 14 and fluid outlet 15. The bed 16 of the chamber 13 may be trough-like in contour to cradle the ampule 17. A crusher bar 18 is substantially co-extensive with the length and width of the chamber 13 and is adapted to contact the ampule 17. An operating stem 19 moves the crusher bar 18 upwardly and downwardly with respect to the bed 16 and breaks the frangible ampule 17. The operating stem 19 extends from the upper block 12 through a gland or port 20, the upper end being received by a threaded yoke 21 within which it is operated by turning handle 22. Other means, such as solenoids, hydraulic cylinder and the like, may also be used to position and control the operating stem 19 and the attached crusher bar 18.

The ampule 17 may be made of glass or other rigid inert material. However, it is also contemplated that flexible plastic tubes or "pillows" containing the sample to be analyzed may be used. In such instance, it may be desirable to provide the crusher bar 18 with spurs or prongs (not shown) adapted to puncture the ampule 17. In general, however, I prefer to use a frangible ampule which shatters on impact since this facilitates the complete discharge of the sample into the chamber 13 from which it may be carried by the flowing gasiform fluid stream.

The force required to crush the ampule may be reduced by including projections on the crushing bar to crack the ampule as the bar is brought against it. By providing a V-shaped bed 16 in the chamber 13, there is less disturbance of the carrier gas flow pattern than when the crusher bar contacting surface conforms to the surface of the chamber. It is also contemplated that the crusher bar may comprise a hollow cylinder open at both ends, be constructed of perforated or woven metal and in general constructed so as to minimize obstruction of the carrier flow gas by the crusher bar.

Reverting to FIGURE 1, the injector apparatus 26 (embodiments of which are shown in FIGURES 2-9) is arranged within a temperature-controlled zone 27. The temperature-controlled zone 27 may comprise heaters or heat exchange tubes flowing a heat exchange medium through or about the body of the injector apparatus 26. If desired, an insulation means adapted to bring the ampule contents to the temperature of the gas flowing through the chamber 13 may be used without separate heating or cooling.

The injector 26 is connected on valved line 24 whereby the sample from the frangible container 17 may be carried by the gas flowing through the injector 26 into the column 23 via multi-way valve 28. Valved bypass line 29 is provided to divert the gas flow around the injector 26 and directly to the column 23. If desired, a vent or purge line 28a can be associated with valve 28 as shown. Thus, sample may be transferred from injector 26 into column 23, carrier gas may be passed through column 23 without sample, and carrier gas can purge the injector 26 and be vented through line 28a.

Further detailes of the injection apparatus are shown in FIGURES 2 to 5 inclusive. In this apparatus, the ends of the chamber 13 in the block 11 are closed by removable plugs 11a and the inlet 14 and the outlet 15 enter through the lower block 11 at points spaced inwardly from the ends of the chamber. Accordingly, the ampule 17 may be introduced into the chamber 13 by removing one of plugs 11a. It will be understood, however, that in the embodiment of FIGURE 1, the upper block 12 may be removed by removing the screws 12a which thread into lower block 11 as shown in FIGURE 4.

Figure 6:
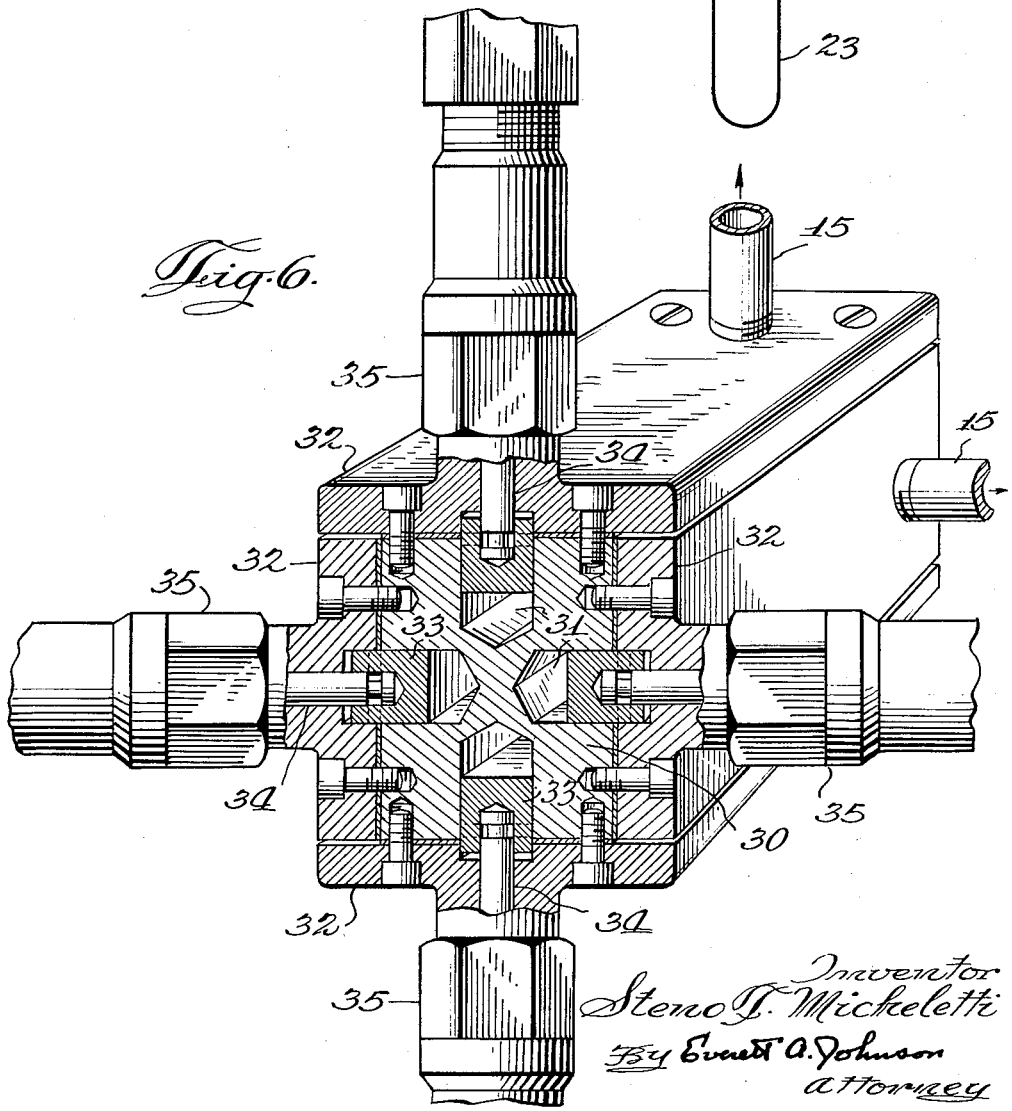
FIGURE 6 is a perspective, partly in section, of an embodiment adapted to charge a plurality of samples.

Referring to FIGURE 6, I have illustrated a multiple crusher design which includes a block 30 providing a plurality of chambers 31 which terminate short of the ends of the block 30. Across the faces of the block 30 are removable plates 32 which carry the crusher bars 33 operated by stems 34 through the glands 35. Not shown in FIGURE 6 are the inlet ducts 14 which introduce the carrier gas into the chambers 31 to sweep the sample therefrom via the outlet ducts 15.

FIGURES 7, 8 and 9 illustrate another embodiment of a multiple crusher which includes a rotatable cylindrical block 36 approximately 2.5 inches in diameter, having peripheral chambers 37 which are approximately 0.375 inch in diameter and depth. Such a cylinder is designed to accommodate 6 to 8 ampules containing the sample to be injected. These chambers 37 are C-shaped, i.e. about 270° of a circle in cross-section instead of 180° or V-shaped slots as to provide a scooping edge 38 on each side of a chamber 37. This prevents any ampule fragments from wedging between the rotatable cylinder 36 and the outer body 39.

The cylindrical block 36 is rotated by a shaft 40 operating through a packing gland 41 carried by the removable plate 42 abutting one end of the hollow body 39 and removably secured thereto by wing nuts 43. The exposed end 36a of the cylinder 36 is provided with a key slot 52 which is engaged by a corresponding male member carried by the shaft 40 in the removable end plate 42. When the end plate 42 has been removed from the housing 39, access may be had to the ends of the chambers 37 and the capsules inserted. When the injector is fully charged with ampules, the end plate 42 is replaced and secured by wing nuts 43.

The cylinder 36 and the housing or body 39 are machined to close tolerances to minimize flow of gas through other than the desired chamber 37 brought into register with the crusher bar 44 and inlet 45 and outlet 46. To minimize any bypassing of a given chamber 37 an O-ring seal 49 may be provided about the slot 50 through which the crusher bar 44 enters a chamber 37 in housing 39. As in the case of the single crusher embodiments, the crusher bar 44 is carried by a stem 47 operating through packing gland 48 fixed to plate 51. A coil spring 54 acting on stem 47 normally holds the bar 44 retracted within slot 50. However, depressing the stem manually, by a cam or the like, brings the bar into a chamber 37.

Carrier gas is introduced by inlet 45 which discharges into the chamber 37 brought into register with the crusher bar 44 by rotating cylinder 36 through shaft 41 and indexed handle 41a. The carrier gas flows through such chamber 37 and leaves the housing 39 by way of outlet 46 carried by a second end plate 42a. The remote end of the cylinder 36 is supported by means of a pivot or bearing on the sealed but removable back plate 42a.

Carrier gas may be used to purge air from the injector 26 after loading by opening a purge vent 28a illustrated schematically in FIGURE 1. This provides for removal of all air from the injector 26 prior to switching to the controlled flow of carrier gas therethrough in preparation for charging the sample from the ampule into column 59. If desired, separate purge lines may be provided, such as through plugs 11a.

Although hand-controlled means have been described, the operating stems of the apparatus may be operated by a solenoid, hydraulic diaphragm, striking hammer, spring-loaded shaft means and cam, or the like. Such systems may be synchronized with means for rotating the cylinder of the multiple injector of FIGURES 7-9 so that the sample ampules may be sequentially brought into register with the crusher bar and it may in turn be reciprocated within the chamber under power on a time-cycle basis.

Reverting to FIGURE 1, after the sealed sample container 17 is broken, sample and carrier gas flow from injector 26, through the packed column 23, and into the detector 25 for identification. The column may be of the absorption or partition type but my invention is not limited to any particular type of column 23 or detector 25.

In routine analytical procedures, it is imperative that the apparatus be capable of repeatedly delivering uniformly sized samples. My apparatus delivers accurate and precise samples corresponding to the capacity of the frangible ampule and this assures repeatable analytical precision. Analytical procedures are simplified significantly by the use of my device thereby making possible the adaptation of gas chromatographic analysis to routine operations.

The unit is so constructed as not to require any separate lubricant material and thereby contamination of the samples is avoided which otherwise may occur with conventional barrel-plug valve assemblies. Likewise, the lubricant-free construction permits the repeated delivery of samples of the same volume without any possibility of loss due to leakage, or absorption in any lubricant.

From the above it will be apparent that I have attained the objects of the invention and although it has been described with reference to preferred embodiments thereof, it is to be understood that these are by way of illustration only. Accordingly, it is contemplated that modifications and variations in the design and in the choice of materials of construction may be made in the apparatus by those skilled in the art in view of my description without departing from the spirit of the invention.

What I claim is:

1. An apparatus for sequentially injecting a plurality of capsule-enclosed analytical samples to a gas chromatographic analyzer comprising a housing, a plurality of capsule-receiving chambers in said housing, said chambers comprising open peripheral channels in a rotatable body, movable ampule crusher means within said housing and operable within said chambers, said crusher means comprising an elongated bar which is substantially co-extensive with the length and width of said channels, which bar is shaped to provide an open channel between said bar and a channel when said bar is depressed, index means for registering individual channels with said crusher means, fluid inlet and outlet means communicating with a channel aligned with said crusher means, and operating means extending through said housing for manipulating said crusher means.

2. An apparatus for sequentially releasing a plurality of capsule-enclosed analytical samples into a flowing gas stream comprising: a housing; a rotatable body within said housing, said housing having a plurality of open elongated trough-shaped chambers peripherally-spaced therein each adapted to receive and cradle an elongated frangible capsule; fluid inlet and outlet ducts communicating with one of said chambers; elongated crusher means operable within said one chamber toward said trough-shaped portion, said crusher means comprising an elongated bar which is substantially co-extensive with the length and width of the said chamber above said trough-shaped portion and which is shaped to provide an open channel below said bar and over said trough-shaped portion when said bar is depressed; operating means coacting with said crusher means whereby said frangible capsule is ruptured when said bar is depressed and the contents thereof swept away by fluids flowing through the open channel provided below said bar and over said trough-shaped bed; and means for rotating said rotatable body to align the chambers with the crusher means and the fluid inlet and outlet ducts.

References Cited in the file of this patent
UNITED STATES PATENTS

| | | |
|---|---|---|
| 1,383,270 | Henning | June 28, 1921 |
| 2,234,499 | McAllister | Mar. 11, 1941 |

OTHER REFERENCES

Book: Gas Chromatography, by Keulemans, published by Reinhold Publishing Co., New York, April 1957.

Publication: Gas Chromatography, published in Oil and Gas Journal, Dec. 17, 1956.